United States Patent
Phan

(10) Patent No.: US 9,877,166 B2
(45) Date of Patent: Jan. 23, 2018

(54) PROVIDING BROADCAST SERVICE IN BROADCAST SERVICE RESERVED CELLS

(71) Applicant: Telefonaktiebolaget L M Ericsson (publ), Stockholm (SE)

(72) Inventor: Mai-Anh Phan, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 38 days.

(21) Appl. No.: 14/400,876

(22) PCT Filed: May 14, 2013

(86) PCT No.: PCT/EP2013/059899
§ 371 (c)(1),
(2) Date: Nov. 13, 2014

(87) PCT Pub. No.: WO2013/171192
PCT Pub. Date: Nov. 21, 2013

(65) Prior Publication Data
US 2015/0124682 A1 May 7, 2015

Related U.S. Application Data

(60) Provisional application No. 61/646,533, filed on May 14, 2012.

(51) Int. Cl.
*H04W 4/06* (2009.01)
*H04W 72/00* (2009.01)
(Continued)

(52) U.S. Cl.
CPC ........... *H04W 4/06* (2013.01); *H04W 72/005* (2013.01); *H04W 72/082* (2013.01); *H04W 36/0083* (2013.01); *H04W 36/30* (2013.01)

(58) Field of Classification Search
None
See application file for complete search history.

(56) References Cited

U.S. PATENT DOCUMENTS

| 2005/0237961 | A1* | 10/2005 | Yi | H04W 36/30 370/312 |
| 2011/0128903 | A1* | 6/2011 | Futaki | H04W 72/005 370/312 |
| 2012/0236776 | A1* | 9/2012 | Zhang | H04W 48/12 370/312 |

OTHER PUBLICATIONS

3rd Generation Partnership Project, "3rd Generation Partnership Project; Technical Specification Group Radio Access Network; Evolved Universal Terrestrial Radio Access Network (E-Utran); M2 Application Protocol (M2AP) (Release 10)", Technical Specification, 3GPP TS 36.443 V10.5.0, Mar. 1, 2012, pp. 1-85, 3GPP, France.

(Continued)

*Primary Examiner* — Huy D Vu
*Assistant Examiner* — Teisha D Hall
(74) *Attorney, Agent, or Firm* — Coats & Bennett, PLLC

(57) ABSTRACT

The invention relates to methods and base stations for supporting a broadcast service within a cell of a base station not transmitting the broadcast service. A method in a base station controlling a cell serving a user equipment supports a broadcast service from a neighboring cell. The method comprises the steps: receiving an indication that the serving base station shall not transmit the broadcast service in the cell serving the user equipment; receiving control information required by the user equipment for receiving the broadcast service from the neighboring cell; and transmitting the control information to the user equipment via the cell serving the user equipment.

20 Claims, 5 Drawing Sheets

(51) Int. Cl.
*H04W 72/08* (2009.01)
*H04W 36/30* (2009.01)
*H04W 36/00* (2009.01)

(56) References Cited

OTHER PUBLICATIONS

Huawei, "Introduction of Service Continuity Improvements for MBMS on LTE", Change Request, 3GPP TSG-Ran WG2 Meeting #77bis, Apr. 15, 2012, pp. 1-8, R2-121900, 3GPP.
Ericsson, "Correction of eMBMS functions", Change Request, 3GPP TSG RAN WG3 Meeting #58, Nov. 5, 2007, pp. 1-103, R3-072042, 3GPP.
Orange, "Text proposal for MBMS Service continuity when moving between SFN and non-SFN zones", 3GPP TSG-RAN WG3 #56, May 7, 2007, pp. 1-4, Tdoc R3-0711004, 3GPP.
Sälzer, T., "MBMS support in E-Utran", 3GPP-DVB Workshop, Kansas City, US, Mar. 16, 2011, pp. 1-16, RCD-11002, version 1.0, 3GPP.

\* cited by examiner

PROVIDING BROADCAST SERVICE IN BROADCAST SERVICE RESERVED CELLS

TECHNICAL FIELD

The invention relates to methods for supporting a broadcast service from a neighboring cell and to corresponding base stations. In particular, the invention relates to methods for supporting a Multimedia Broadcast Multicast Service (MBMS) in MBMS Single Frequency Network (MBSFN) area reserved cells and to corresponding base stations.

BACKGROUND

In a typical cellular network, User Equipments (UEs), communicate via a Radio Access Network (RAN) connected to one or more Core Networks (CNs).

A user equipment is a mobile terminal by which a subscriber can access services offered by an operator's network. The user equipments may be for example communication devices such as mobile telephones, cellular telephones, laptops or tablet computers, sometimes referred to as surf plates, with wireless capability. The user equipments may be portable, pocket-storable, hand-held, computer-comprised, or vehicle-mounted mobile devices, enabled to communicate voice and/or data, via the radio access network, with another entity, such as another mobile station or a server such as a content providing server. User equipments are enabled to communicate wirelessly in the cellular network.

The cellular network covers a geographical area which is divided into cell areas. Each cell area is served by a base station, e.g. a Radio Base Station (RBS), which sometimes may be referred to as e.g. "eNB", "eNodeB", "NodeB", "B node", or BTS (Base Transceiver Station), depending on the technology and terminology used. Multimedia Broadcast Multicast Service (MBMS), an example of a broadcast service, is a point-to-multipoint interface specification for existing and upcoming 3GPP cellular networks. MBMS is designed to provide efficient delivery of broadcast and multicast services, both within a cell as well as within the core network. For broadcast transmission across multiple cells, it defines transmission via single-frequency network configurations.

Target applications comprise mobile TV and radio broadcasting, as well as file delivery and emergency alerts.

Multimedia Broadcast Multicast Service (MBMS) was introduced in 2005 for different types of Radio Access Networks (RAN), i.e. for Global System for Mobile Communications (GSM), for Enhanced Data Rates for GSM Evolution (EDGE) RAN (GERAN), and for Universal Terrestrial RAN (UTRAN) Rel-6 and in 2010 for Evolved UTRAN (E-UTRAN) Rel-9 for more efficient distribution of identical services, i.e. services that are identical for several users.

For MBMS, two new logical channels were introduced: First, the Multicast Control Channel (MCCH), which carries information about MBMS specific transport channel configurations, in E-UTRAN (also referred to as Long Term Evolution of UMTS or in short, LTE) the Multicast Channel (MCH), and the corresponding MBMS services. Second, the Multicast Traffic Channel (MTCH), which carries the MBMS data of a service. The MCCH contains information for the User Equipment (UE) to be able to read a specific MBMS service. Both MCCH and MTCH are mapped to one or more MCHs. In E-UTRAN, SystemInformationBlock-Type13, in short SIB13, which is cell specific, contains information about MCCH configuration and scheduling, such that the UE can find and read the MCCH.

For MBMS, broadcast services are generally offered within a large geographic area, consisting of one or more cells. In order to exploit this, these cells apply MBMS single frequency network (MBSFN) operation, which means that identical signals are transmitted on the same time-frequency radio resources from each cell, such that the received signal power in the terminal is increased. The cells that offer the same set of MBMS services and the same scheduling of MBMS service sessions belong to one MBSFN area. The cells within the same MBSFN area transmit all MCHs within this MBSFN area in MBSFN mode, i.e. the corresponding MCCH and all MTCHs.

In order to achieve MBSFN operation, one essential requirement is that the cells which belong to the same MBSFN area are tightly synchronized (e.g. in the order of micro-seconds). From a terminal perspective all signals transmitted from the cells within the MBSFN area combine over the radio resulting in an improved signal to interference and noise ratio (SINR). If the cells within an MBSFN area are very close to each other, the aggregated SINR will be unnecessarily high. Therefore, 3GPP introduced MBSFN area reserved cells, which do not contribute to the MBSFN transmission and therefore do not advertise its availability. Furthermore, MBSFN area reserved cells are allowed to transmit other services on the resources allocated for the MBSFN transmission, but only with restricted power to avoid an inacceptable SINR of the MBSFN signal.

As the reserved cells do not transmit the broadcast service, the base station controlling the reserved cell requires less transmit power, which supports the idea of power efficient radio networks. Still there is a wish that a UE that is served by a reserved cell is provided with the broadcast service in a robust and efficient way. So, it is an object to provide improved methods and base stations for supporting a broadcast service within a cell of a base station that is not transmitting the broadcast service. It is an object to improve the quality of the broadcast service, to lower interference in cellular systems and to increase efficiency in using the radio resource. It is an object to help saving transmit power in a radio network.

SUMMARY

According to an embodiment of the invention, a method in a base station controlling a cell serving a user equipment is provided. The method supports a broadcast service from a neighboring cell. The method comprises the steps: receiving an indication that the serving base station shall not transmit the broadcast service in the cell serving the user equipment; receiving control information required by the user equipment for receiving the broadcast service from the neighboring cell; and transmitting the control information to the user equipment via the cell serving the user equipment;

According to an embodiment of the invention, a base station for controlling a cell for serving a user equipment and for supporting a broadcast service from a neighboring cell is provided. The base station comprises a network interface for receiving an indication that the serving base station shall not transmit the broadcast service in the cell serving the user equipment and for receiving control information required by the user equipment for receiving the broadcast service from the neighboring cell; and a radio interface for transmitting the control information to the user equipment via the cell serving the user equipment.

DETAILED DESCRIPTION OF EMBODIMENTS

In the following, the invention will be explained in more detail by referring to exemplary embodiments and to the accompanying drawings. The illustrated embodiments relate to concepts for supporting a broadcast service and to a base station supporting the service. The concepts will be explained from a general perspective and will also be explained by referring to embodiments which involve a mobile network according to 3GPP LTE specifications.

Figure 1:
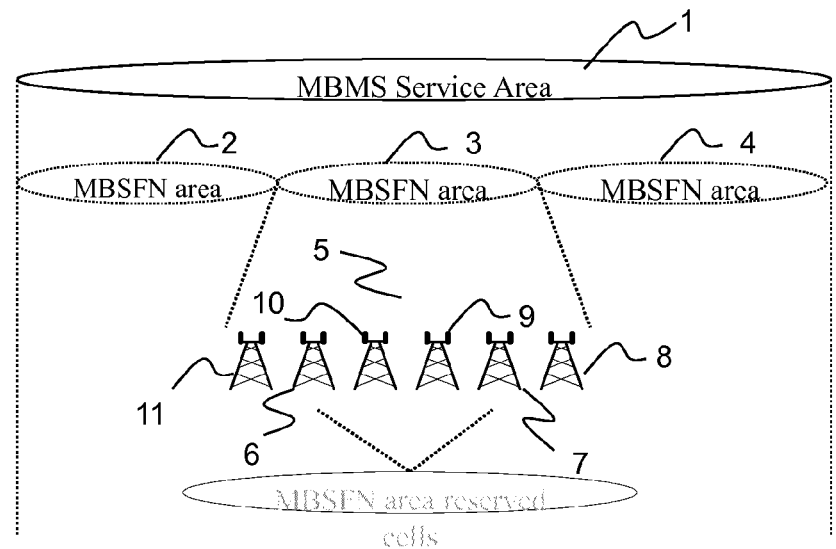
FIG. 1 schematically illustrates an example of a setup for providing a broadcast service in a cellular communication system.

FIG. 1 schematically illustrates an example of a setup for providing a broadcast service in a cellular communication system. As an example of a broadcast service it is referred to MBMS. An MBMS Service Area 1 is divided into three MBSFN areas: an MBSFN area 2, an MBSFN area 3, and MBSFN area 4. The MBSFN area 3 comprises several base stations 5. From the group of base stations 5, some are referred to as MBSFN area reserved base stations, which create or control MBSFN area reserved cells and some are not MBSFN area reserved and do not create MBSFN area reserved cells, i.e. the cells created by the base station participate in the MBSFN transmission within the MBSFN area. In FIG. 1, a base station 6 and a base station 7 create MBSFN area reserved cells, whereas the remaining base stations (base stations 8, 9, 10 and 11) of the group of base stations 5 do not create cells that are MBSFN area reserved, i.e. the remaining base stations participate in the MBSFN transmission and thus, belong to the MBSFN area.

Figure 2:
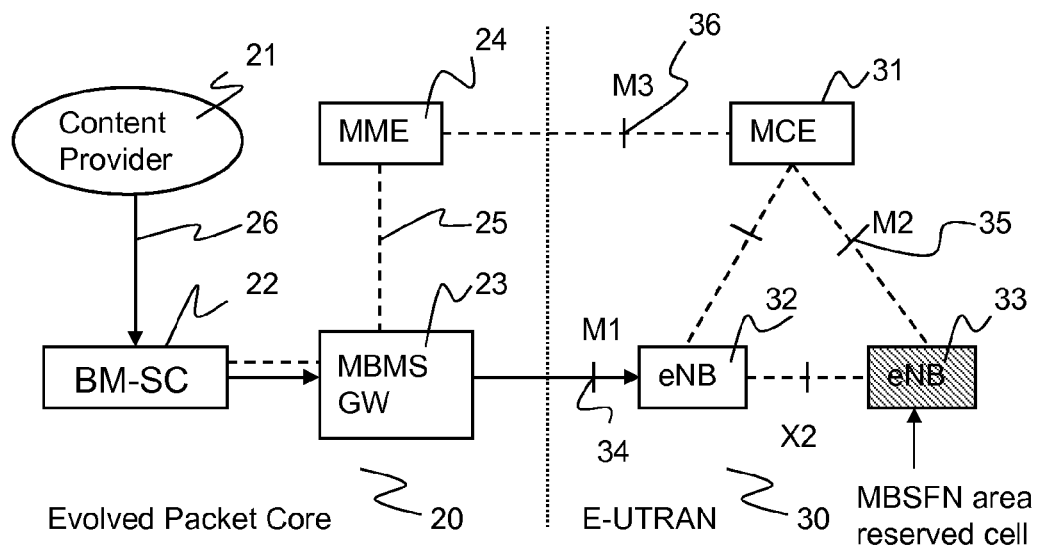
FIG. 2 schematically illustrates an example of a network architecture comprising a broadcast service reserved cell.

FIG. 2 schematically illustrates an example of a network architecture comprising an MBSFN area reserved cell, which is an example of a broadcast service reserved cell. An Evolved Packet Core (EPC) network 20 comprises a Content Provider 21, a Broadcast Multicast Service Center (BM-SC) 22, a MBMS Gateway 23 and a Mobility Management Entity (MME) 24. A control plane 25 is indicated by a dashed line, a user plane 26 is indicated by a solid arrow line. An E-UTRAN 30 comprises a Multi-Cell/Multicast Coordination Entity 31, a MBSFN eNodeB 32 and an MBSFN area reserved eNodeB 33 creating an MBSFN area reserved cell. A user plane interface 34, an E-UTRAN internal control plane interface 35 and a control plane interface 36 between EPC and E-UTRAN are indicated in the example architecture.

The Multi-Cell/Multicast Coordination Entity (MCE) 31 determines an allocation of radio resources used by all base stations (eNodeBs) within the MBSFN area for multi-cell MBMS transmissions using MBSFN operation. Information on MCCH and MCH configuration is also provided to MBSFN area reserved cells via the interface 35 (M2) such that the MBSFN subframes can be considered for low-power transmission of unicast services.

In the described scenario, a UE which is receiving an MBMS service might not be able to continue MBMS reception within an MBSFN area reserved cell when it enters an MBSFN area reserved cell because it cannot find the required control information and is not required to save control information related to the MCCH.

A UE which would save control information related to the MCCH cannot continue MCH reception as soon as the required control information, such as MCCH configuration and/or schedule is changed.

Figure 3:
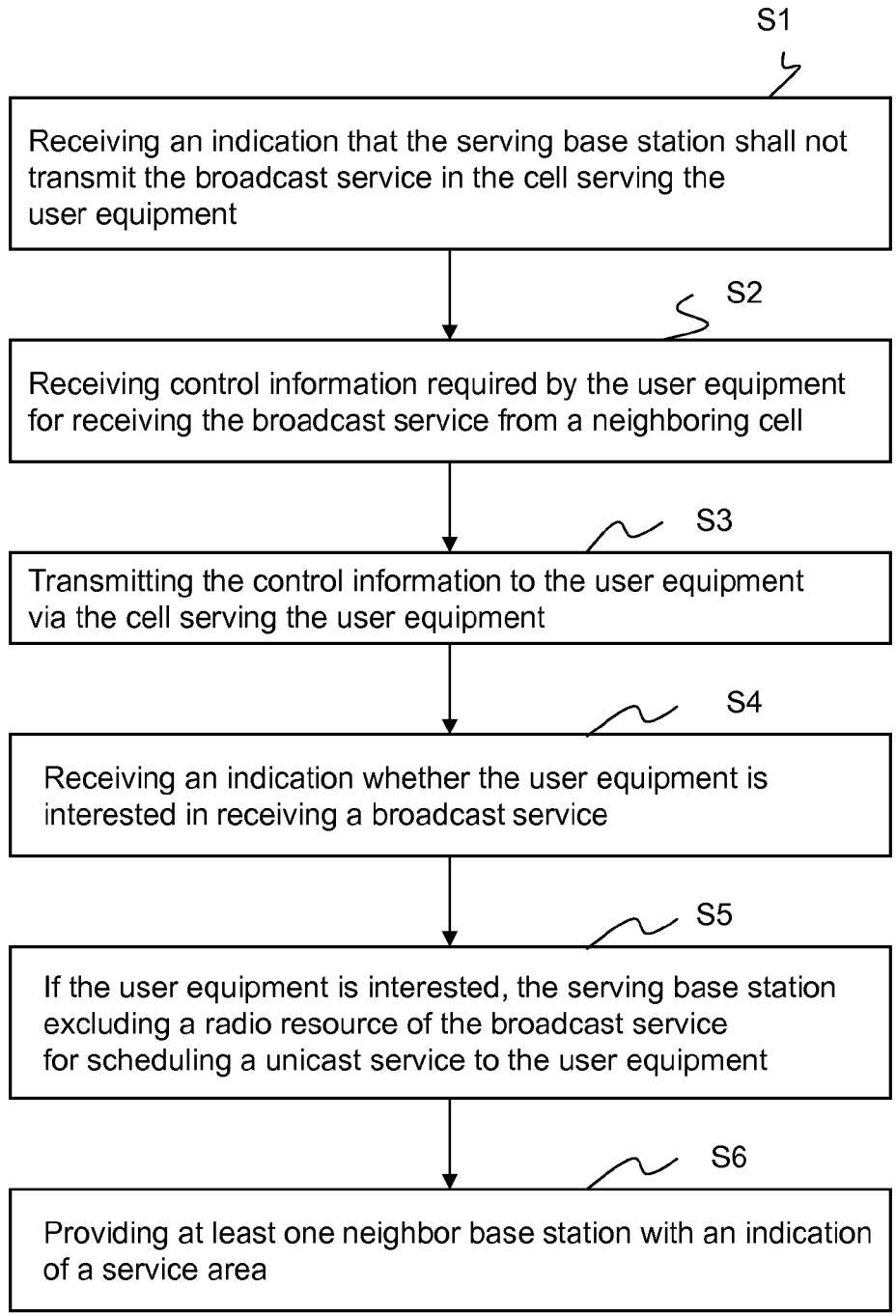
FIG. 3 shows a flowchart for illustrating a method in a base station according to one embodiment of the invention.

In these cases, a UE which is served by an MBSFN area reserved cell cannot receive an MBMS service of interest, even if the SINR of the MBMS service of interest is sufficiently high. Accordingly it is an object of the invention to obviate at least some of the above disadvantages FIG. 3 shows a flowchart for illustrating of a method in a base station according to one embodiment. The method runs in a base station that is serving a user equipment. An example of a base station is an eNodeB. The base station controls a cell that serves a user equipment that is located within the cell. The method supports a broadcast service, such as an MBMS service, provided by a neighboring cell. The neighboring cell providing the service means that the neighboring cell transmits the service on a particular radio resource e.g. according to a broadcast schedule. Supporting the broadcast service comprises that the base station that controls the cell serving the user equipment takes measures that the user equipment can actually receive and decode the broadcast service, e.g. by providing required control data. The serving base station does not need to transmit the broadcast service in the cell serving the user equipment as the user equipment can receive the broadcast service from one or more neighboring cells. For example in a handover situation from the neighboring cell to the serving cell, the user equipment shall still be able to receive the broadcast service from the neighboring cell although it is already served by the serving cell. The neighboring cell and the reserved serving cell may be created by the same base station.

In step S1, the serving base station receives an indication that it shall not transmit the broadcast service in the cell serving the user equipment. And consequently the serving base station does not transmit the broadcast service in the reserved cell, i.e. the cell serving the user equipment and not broadcasting the broadcast service. The user equipment may nevertheless receive the service from the neighboring cell or from multiple neighboring cells. The serving base station may receive the indication from a control node such as an MCE. Alternatively, the serving base station may receive the indication from another base station or from a user equipment. As already mentioned, in case not every base station or cell of a particular service area transmits the service, the service may still be received by the user equipment with sufficient quality while interference remains below a certain threshold. The cell of a base station for which the base station received the indication to not transmit the broadcast service and in which the broadcast service is not broadcasted may be referred to as broadcast service reserved cell. The base station controlling such a cell may be referred to as broadcast service reserved base station.

In step S2, the serving base station receives control information required by the user equipment for receiving the broadcast service from the neighboring cell. The control information may also be used by the user equipment to determine general availability of the broadcast service. In LTE such control information may comprise MCCH related Broadcast Control Channel (BCCH) configuration, MBMS scheduling information, MBMS SAI(s) (Service Area Identity(s)). Within cellular networks, in general, the control information relates to control data that is required by the user equipment to be able to receive the broadcast service. For example, the user equipment needs to be capable to locate and decode the service on a radio resource, for which it requires particular control information. The control information may also relate to control data that is used by the user equipment to determine general availability of the broadcast service even if the service is not ongoing.

In step S3, the serving base station transmits the control information to the user equipment; In LTE, the control information may be provided within multiple SystemInformationBlocks, e.g. SIB13 and SIB14 or any other suitable SIB. So, transmitting control information to the user equipment may be achieved by broadcasting the information.

The required control information for receiving the broadcast service is normally provided to the user equipment from the serving base station via the cell serving the user equipment. The cell serving the user equipment is a broadcast service reserved cell as the broadcast service is not transmitted in the cell after the indication is received that the cell shall not transmit the broadcast service. As, at step S3, the user equipment has received the required control data for receiving the broadcast service and as the user equipment may receive the service from a neighboring cell, the user equipment is now in a position that it may receive the broadcast service although it is served by a cell in which the broadcast service is not transmitted. For example in a handover situation from a neighboring cell to a broadcast service reserved cell, continuity of the broadcast service is supported. The user equipment may also start to receive the broadcast service when located in the broadcast service reserved cell. At the same time transmit power is saved in the base station controlling the broadcast service reserved cell as it does not transmit the broadcast service in the reserved cell. Still the user equipment is able to receive the broadcast service from a neighboring cell.

In an optional further step S4, the serving base station receives an indication whether the user equipment is interested in receiving the broadcast service. For example, the serving base station may receive this indication from the user equipment, from a neighboring base station or from a network entity. The interest in receiving the broadcast service may be indicated by indicating a frequency on which the broadcast service is transmitted. In general, there can also be more than one broadcast service. E.g. several frequencies can be indicated to show interest in more than one broadcast service or frequency.

In step S5, the serving base station may check whether the user equipment is interested. If the user equipment is interested, the serving base station excludes radio resources used for broadcast transmissions of the broadcast service for scheduling a unicast service to the user equipment.

In this way it is ensured that the serving base station does not transmit unicast data to the user equipment on the radio resource of the broadcast service and thus avoids the situation in which the user equipment possibly receives two services, i.e. the broadcast service and a unicast service, on the same radio resource, which would degrade the quality of both services. A high quality of the broadcast service from the neighboring cell is thus assured.

In an optional further step S6, the serving base station may provide at least one neighboring base station with an indication of a service area. A service area defines an area in which one or more broadcast services may be provided. A base station can be within such a service area or outside of the service area. In the latter case it will neither support nor provide a broadcast service of the service area. The service reserved base station (i.e. the base station controlling the service reserved cell) and the neighboring base station may generally be within the same service area. The indication may be provided via an interface between base stations, such as the X2 interface, or via semi-static configuration, e.g. operation and maintenance (O&M) configurations within the Operation and Support System (OSS). The neighboring base station may thus provide the user equipment with broadcast service related control information and thus, the user equipments interested in broadcast service reception may be moved to the service reserved cell such that it can start broadcast service reception.

Figure 4:
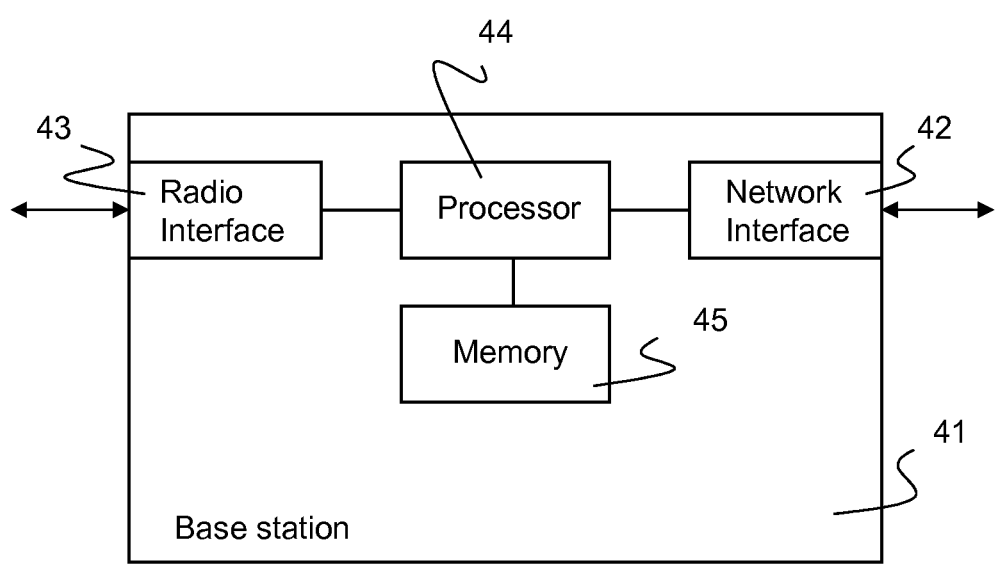
FIG. 4 schematically illustrates a base station according to one embodiment of the invention.

FIG. 4 schematically illustrates exemplary structures for implementing the above-described concepts in a base station 41. The base station 41 is configured for controlling a cell serving a user equipment and for supporting a broadcast service from a neighboring cell. The base station 41 comprises a network interface 42 for receiving an indication that the serving base station shall not transmit the broadcast service in the cell serving the user equipment and for receiving control information required by the user equipment for receiving the broadcast service from the neighboring cell. The control data may comprise information to be used by the user equipment to determine general availability of the broadcast service even if the service is not ongoing.

The base station 41 further comprises a radio interface 43 for transmitting the control information to the user equipment via the cell serving the user equipment. An example of the base station 41 can be an eNodeB as defined in LTE specifications. The network interface may be the M2 interface or alternatively an interface between base stations or an interface for communicating control data with other nodes of the mobile network. Further, the base station includes a processor 44 coupled to the network interface 42 and the radio interface 43, and a memory 45 coupled to the processor 44.

The radio interface 43 may further be configured for receiving an indication whether the user equipment is interested in receiving the broadcast service. The processor 44 may further be configured for checking whether the user equipment is interested and for excluding a radio resource of the broadcast service for scheduling a unicast service to the user equipment in the cell serving the user equipment, if the user equipment is interested.

The radio interface 43 or the network interface may be configured for providing at least one neighbor base station with an indication of a service area. The network interface 43 may be the X2 interface. The indication may also be provided by an operation and support system (OSS).

The memory 45 may include a read-only memory (ROM), e.g., a flash ROM, a random-access memory (RAM), e.g., a Dynamic RAM (DRAM) or a static RAM (SRAM), a mass storage, e.g., a hard disc drive or a solid state disk, or the like. The memory 45 includes suitably configured program code to be executed by the processor 44 so as to implement the above-described functionalities of the base station 41.

It is to be understood that the structure as illustrated in FIG. 4 is merely schematic and that the base station 41 may actually include further components which, for the sake of clarity, have not been illustrated, e.g., further interfaces. Also, it is to be understood that the memory 45 may include further types of program code modules, which have not been illustrated. For example, the memory 45 may include program code modules for implementing typical functionalities of a respective base station.

According to some embodiments, also a computer program product may be provided for implementing concepts according to embodiments of the invention, e.g., a computer-readable medium storing the program code and/or other data to be stored in the memory 45.

Figure 5:
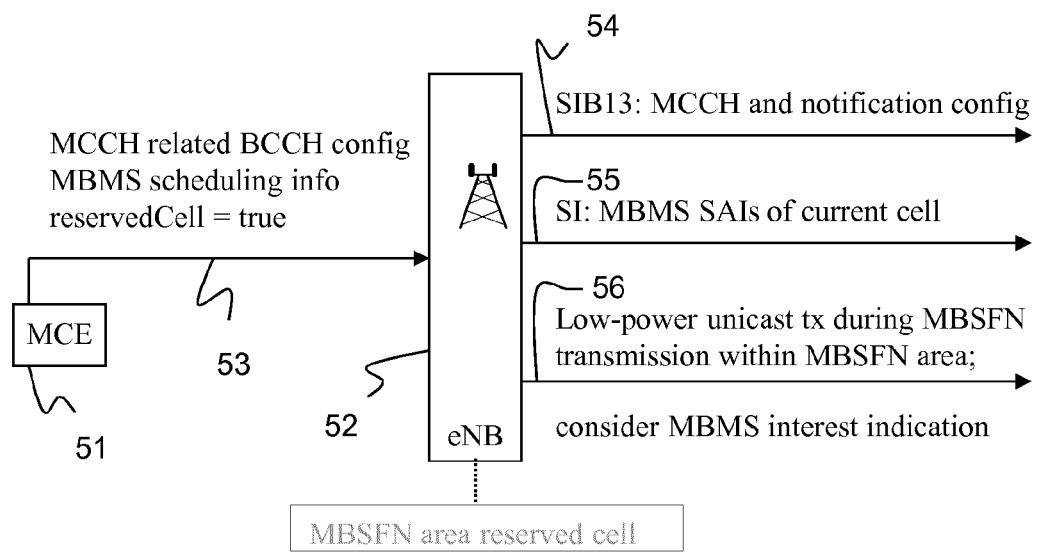
FIG. 5 shows a flowchart for illustrating a flow of control information according to one embodiment of the invention.

FIG. 5 shows a flowchart for illustrating a flow of control information according to one embodiment in an LTE context. An MCE 51 provides an eNodeB 52 with control information 53. The control information 53 comprise an MCCH related BCCH configuration, an MBMS scheduling information, and a flag for each cell created by the eNodeB 52, "reservedCell=true", which indicates that the eNodeB 52 shall configure the corresponding cell as an MBSFN area reserved cell. An eNodeB that creates at least one MBSFN area reserved cell is referred to as an MBSFN area reserved eNodeB. The MBSFN area reserved cell sends an MCCH and notification configuration 54 within SIB13 to a user equipment. The eNodeB 52 further sends system information 55 comprising one or more MBMS SAI(s) of the current cell to the user equipment. Within a radio resource on which MBSFN services are transmitted, the eNodeB 52 will limit power of unicast transmissions 56 on the MBSFN radio resource to reduce interference with the MBSFN service(s). The eNodeB 52 may further take an MBMS interest indication of the user equipment into account. For example, in case the user equipment indicates that it is interested in receiving the MBMS service, the eNodeB refrains from sending unicast data on the radio resource of MBMS services. Alternatively, the eNodeB may further reduce the power of the unicast transmissions within the radio resource of the MBMS service.

MBSFN area reserved eNodeBs/cells may be configured by the MCE and may receive relevant information about MCCH configuration in the IE "MCCH related BCCH config item" and content in "MBMS Scheduling Info" (see e.g. 3GPP TS 36.443 v.9.0.0 and later). These cells can then provide SIB13 and related MBMS notification to indicate MCCH changes to the UE. Then, the UE can receive relevant control information to read the MCCH and thus, relevant information about its MBMS service(s) of interest.

Since the UE's behavior regarding MBMS is based on the MBMS SAI information in system information as described e.g. in change request R2-121900 (3GPP TSG-RAN WG2 Meeting #77bis, Jeju, Korea, Mar. 26th-30th, 2012), the MBSFN area reserved cell broadcasts the MBMS SAIs it belongs to in system information (new SIB, for example SIB14) to allow for optimal UE behavior and to ensure continuous MBMS reception.

In order to avoid that connected MBMS UEs are scheduled for unicast services when MBSFN signals are transmitted by intra-frequency neighbor cells, MBSFN area reserved cells consider information as received in the MBMS interest indication message transmitted from the UE to the serving cell.

Neighbor eNodeBs should know the MBMS SAIs of the MBSFN area reserved cells in order to include this in their system information for MBMS assistance (see 3GPP 82-121900).

With the discussed concepts, MBMS service interruption when the user equipment moves from a cell belonging to the MBSFN area into the MBSFN area reserved cell is avoided. The user equipment is further provided with sufficient control information such that it can start the MBMS reception when it is served by the MBSFN area reserved cell. The user equipment does not try to receive the MBMS service of interest via unicast, such that transmission resources can be saved.

Figure 6:
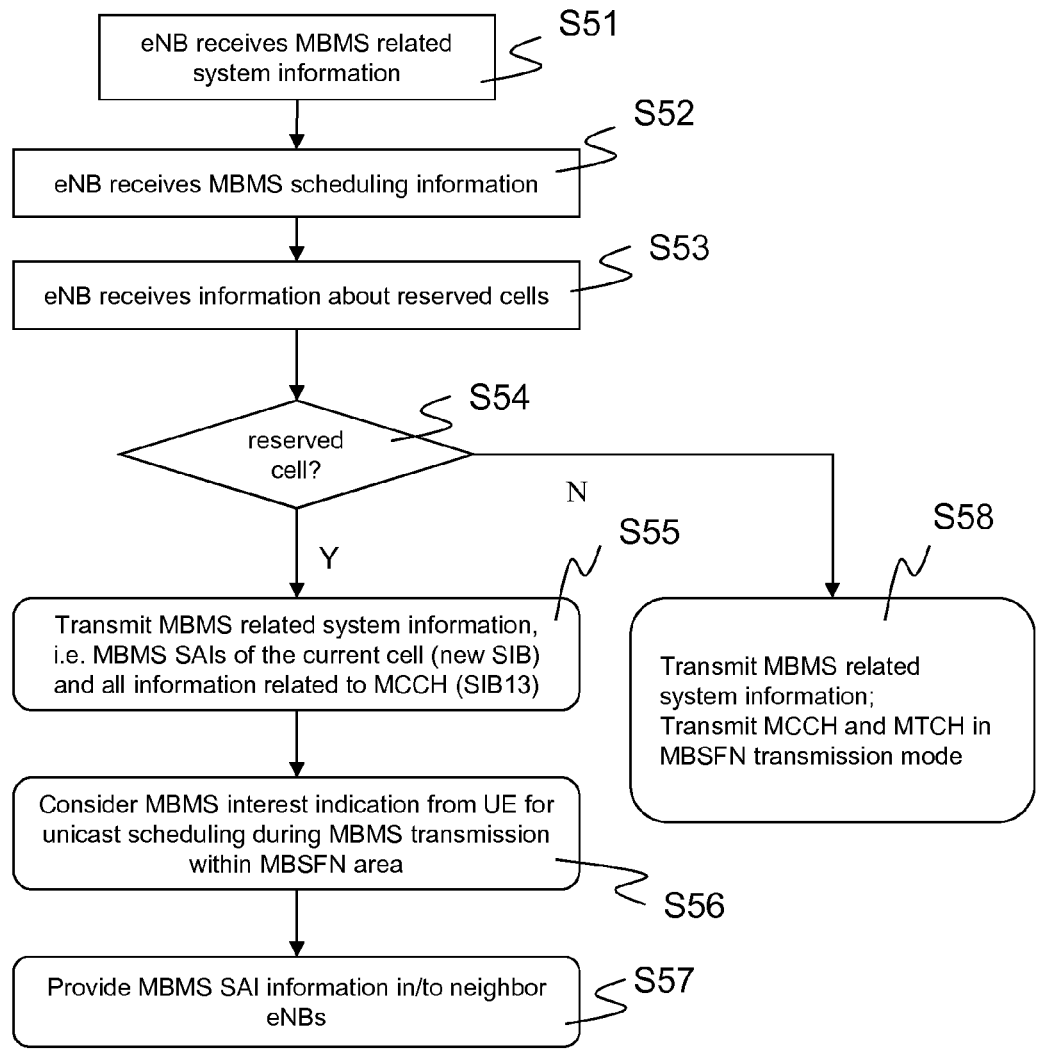
FIG. 6 shows a flowchart for illustrating a method according to one embodiment of the invention.

FIG. 6 shows a flowchart for illustrating a method according to one embodiment. In steps S51, S52 and S53, the eNodeB receives MBMS related system information, MBMS scheduling information, and a flag indicating for a cell or possibly for multiple cells within the eNodeB whether the respective cell shall be an MBSFN area reserved cell. In step S54 it is decided whether the eNodeB shall be an MBMS reserved eNodeB.

If the eNodeB shall not act as MBMS reserved eNodeB, the eNodeB, in step S58, transmits MBMS related system information, e.g. SIB13, new SIB, e.g. SIB14, and MCCH and MTCH in MBSFN transmission mode.

If the eNodeB shall act as broadcast service reserved eNodeB, the eNodeB transmits, in step S55, MBMS related system information, i.e. MBMS SAIs of the current cell (e.g. new SIB, e.g. SIB14) and all information related to MCCH (e.g. SIB13). In step S56, the eNodeB considers MBMS interest indication from UE for unicast scheduling during MBMS transmission within MBSFN area. The MBMS interest indication is used to indicate the frequencies on which the UE is interested to receive MBMS services, and the UE's MBMS vs. unicast priority that the eNodeB may consider in case of congestion. The eNodeB may use the frequency information to avoid serving cell configurations that would disallow MBMS reception on the corresponding frequencies. Alternatively, the eNodeB may initiate an inter-frequency handover such that the UE is moved to the correct MBMS frequency in order to be able to receive the MBMS service(s) of interest. In step S57, the eNodeB provides MBMS SAI information in/to neighbor eNodeBs, i.e. via X2 interface or alternatively, the neighbor eNodeBs obtain MBMS SAI information of the MBSFN area reserved cells controlled by the reserved eNodeB via the Operation and Support System (OSS).

It is to be understood that the examples and embodiments as explained above are merely illustrative and susceptible to various modifications. For example, the concepts could be used in other types of mobile communication networks, not explicitly mentioned so far. Further, it is to be understood that the above concepts may be implemented by using correspondingly designed software in existing nodes, or by using dedicated hardware in the respective nodes.

The invention claimed is:

1. A method, in a base station controlling a cell serving a user equipment, for supporting broadcast service from a neighboring cell, the method comprising:
  receiving an indication, at the base station, that the cell serving the UE is a reserved cell in which the base station shall not transmit broadcast service;
  in response to the indication, refraining from transmitting broadcast service in the reserved cell;
  receiving, at the base station, control information required by the user equipment for receiving broadcast service from the neighboring cell;
  transmitting, from the base station, the control information to the user equipment via the cell serving the user equipment;
  excluding, from a plurality of radio resources considered by the base station for scheduling a unicast service to the UE, one or more radio resources scheduled for the broadcast service from the neighboring cell; and
  scheduling the unicast service from the base station to the UE on one or more non-excluded resources of the plurality of radio resources for simultaneous transmission of the unicast and the broadcast service to the UE.

2. The method of claim 1, the further comprising:
receiving, at the base station, an indication whether the user equipment is interested in receiving a broadcast service; and
if the user equipment is interested in receiving the broadcast service, excluding the one or more radio resources scheduled for the broadcast service from the neighboring cell.

3. The method of claim 2, wherein the indication whether the user equipment is interested in receiving the broadcast service comprises a frequency on which the broadcast service is transmitted.

4. The method of claim 1, further comprising providing at least one neighbor base station with an indication of a service area.

5. The method of claim 1, further comprising:
receiving, at the base station, an indication whether the user equipment is interested in receiving a broadcast service; and
if the user equipment is interested in receiving the broadcast service, reducing a power of a unicast transmission.

6. The method of claim 5, wherein the indication whether the user equipment is interested in receiving the broadcast service comprises a frequency on which the broadcast service is transmitted.

7. The method of claim 1, wherein the control information indicates information required by the user equipment for receiving Multimedia Broadcast Multicast Service.

8. The method of claim 1, wherein the control information indicates availability of a broadcast service to the user equipment.

9. A base station for controlling a cell serving a user equipment and for supporting broadcast service from a neighboring cell, the base station comprising a processor and a memory, the memory containing instructions executable by the processor wherein the base station is configured to:
receive an indication that the cell serving the UE is a reserved cell in which the base station shall not transmit broadcast service;
in response to the indication, refrain from transmitting broadcast service in the reserved cell;
receive control information required by the user equipment for receiving broadcast service from the neighboring cell;
transmit the control information to the user equipment via the cell serving the user equipment;
exclude, from a plurality of radio resources considered by the base station for scheduling a unicast service to the UE, one or more radio resources scheduled for the broadcast service from the neighboring cell; and
schedule the unicast service from the base station to the UE on one or more non-excluded resources of the plurality of radio resources for simultaneous transmission of the unicast and the broadcast service to the UE.

10. The base station of claim 9, wherein the memory contains instructions executable by the processor whereby the base station is configured to:
receive an indication whether the user equipment is interested in receiving a broadcast service;
check whether the user equipment is interested in receiving the broadcast service; and
in response to the user equipment being interested in receiving the broadcast service, exclude the one or more radio resources scheduled for the broadcast service from the neighboring cell.

11. The base station of claim 10, wherein the indication whether the user equipment is interested in receiving the broadcast service comprises a frequency on which the broadcast service is transmitted.

12. The base station of claim 9, wherein the memory contains instructions executable by the processor whereby the base station is configured to provide at least one neighbor base station with an indication of a service area.

13. The base station of claim 9, wherein the memory contains instructions executable by the processor whereby the base station is configured to:
receive an indication whether the user equipment is interested in receiving a broadcast service;
check whether the user equipment is interested in receiving the broadcast service; and
in response to the user equipment being interested in receiving the broadcast service, reduce a power of a unicast transmission.

14. The base station of claim 13, wherein the indication whether the user equipment is interested in receiving the broadcast service comprises a frequency on which the broadcast service is transmitted.

15. The base station of claim 9, wherein the control information indicates information required by the user equipment for receiving Multimedia Broadcast Multicast Service.

16. The base station of claim 9, wherein the control information indicates availability of a broadcast service to the user equipment.

17. A computer program product stored in a non-transitory computer readable medium for controlling a base station controlling a cell serving a user equipment to support a broadcast service from a neighboring cell, the computer program product comprising software instructions which, when run on a processing circuit of the base station, causes the base station to:
receive an indication, at the base station, that the cell serving the UE is a reserved cell in which the base station shall not transmit broadcast service;
in response to the indication, refrain from transmitting broadcast service in the reserved cell;
receive, at the base station, control information required by the user equipment for receiving broadcast service from the neighboring cell;
transmit, from the base station, the control information to the user equipment via the cell serving the user equipment;
exclude, from a plurality of radio resources considered by the base station for scheduling a unicast service to the UE, one or more radio resources scheduled for the broadcast service from the neighboring cell; and
schedule the unicast service from the base station to the UE on one or more non-excluded resources of the plurality of radio resources for simultaneous transmission of the unicast and the broadcast service to the UE.

18. The method of claim 1, wherein the control information indicates a future availability of a broadcast service for a broadcast service that is not currently available for broadcast.

19. The method of claim 1, wherein the simultaneous transmissions are on radio resources allocated for Multimedia Broadcast single frequency network (MBSFN) transmissions, and an excluded resource of the one or more excluded resources is a MBSFN subframe.

20. The method of claim 2, wherein the indication is a Multimedia Broadcast single frequency network (MBSFN) interest indication.

* * * * *